(12) United States Patent  
Rytkönen et al.

(10) Patent No.: US 9,284,162 B2  
(45) Date of Patent: Mar. 15, 2016

(54) LIFTING HOOK AND SAFETY LATCH FOR LIFTING HOOK

(71) Applicant: KONECRANES PLC, Hyvinkää (FI)

(72) Inventors: Ekku Rytkönen, Espoo (FI); Antti Niskala, Hyvinkää (FI); Piia Linnainmaa, Tampere (FI); Marko Lyden, Tampere (FI); Richard Rappu, Helsinki (FI)

(73) Assignee: KONECRANES PLC, Hyvinkää (FI)

( * ) Notice: Subject to any disclaimer, the term of this patent is extended or adjusted under 35 U.S.C. 154(b) by 0 days.

(21) Appl. No.: 14/653,190

(22) PCT Filed: Dec. 17, 2013

(86) PCT No.: PCT/FI2013/051170  
§ 371 (c)(1),  
(2) Date: Jun. 17, 2015

(87) PCT Pub. No.: WO2014/096536  
PCT Pub. Date: Jun. 26, 2014

(65) Prior Publication Data  
US 2015/0329330 A1 Nov. 19, 2015

(30) Foreign Application Priority Data  
Dec. 20, 2012 (FI) .................................... 20126342

(51) Int. Cl.  
*B66C 1/34* (2006.01)  
*B66C 1/36* (2006.01)  
*F16B 45/02* (2006.01)

(52) U.S. Cl.  
CPC .. *B66C 1/36* (2013.01); *F16B 45/02* (2013.01)

(58) Field of Classification Search  
CPC ............. B66C 1/36; B66C 1/34; F16B 45/02; F16B 45/025  
USPC ............ 294/82.2, 82.17, 82.19, 82.24, 82.31, 294/82.33  
See application file for complete search history.

(56) References Cited

U.S. PATENT DOCUMENTS 644,699 A * 3/1900 Woodford ................. B66C 1/36  
24/598.2  
2,866,247 A 12/1958 Clegg  
(Continued)

FOREIGN PATENT DOCUMENTS

FI WO 2014108604 A1 * 7/2014 ................ B66C 1/36  
FR EP 1498384 A1 * 1/2005 ................ B66C 1/36  
(Continued)

*Primary Examiner* — Gabriela Puig  
(74) *Attorney, Agent, or Firm* — Birch, Stewart, Kolasch & Birch, LLP

(57) ABSTRACT

A lifting hook includes a hook body with a hook stem and a hook tip; a safety latch with a fastening end and a free latch end, the fastening end of the safety latch being pivotally fastened close to the stem so as to be moved between an open position and a closed position, the safety latch being in its open position substantially against the inside of the hook body in a position that leaves a hook jaw free while in the closed position the latch end extends across the hook jaw to the hook tip, closing the jaw on the inside thereof; and an actuator for actuating the safety latch, the actuator including a spring arranged between the safety latch and the hook body and forcing the latch end into the closed position, a locking pawl structure and a cam surface arrangement for locking the safety latch into the open position, and a release extending across the jaw for releasing the safety latch from the open position. A safety latch for a lifting hook is also disclosed.

9 Claims, 10 Drawing Sheets

(56) References Cited

U.S. PATENT DOCUMENTS

| | | | |
|---|---|---|---|
| 3,008,210 A | | 11/1961 | Stovern |
| 3,968,988 A | * | 7/1976 | Carfagno .................. B66C 1/36 24/599.8 |
| 4,440,432 A | | 4/1984 | Goris |
| 4,977,647 A | | 12/1990 | Casebolt |
| 5,480,202 A | * | 1/1996 | Gloden .................... B66C 1/36 24/599.8 |
| 5,577,787 A | | 11/1996 | Klope |
| 5,609,378 A | | 3/1997 | Bowers et al. |
| 5,664,304 A | * | 9/1997 | Tambornino .............. B66C 1/36 24/370 |
| 7,946,006 B2 | * | 5/2011 | Thompson .............. F16B 45/02 24/592.11 |
| 8,100,448 B2 | * | 1/2012 | Holmstrom ............... B66C 1/36 294/82.19 |
| 2014/0373320 A1 | * | 12/2014 | Nemec .................... F16B 45/02 24/599.6 |

FOREIGN PATENT DOCUMENTS

| | | | |
|---|---|---|---|
| GB | 956173 A | * 4/1964 | ............... B66C 1/36 |
| JP | 2004-307108 A | 11/2004 | |
| JP | 2005-314018 A | 11/2005 | |
| JP | 2006-076686 A | 3/2006 | |

* cited by examiner

LIFTING HOOK AND SAFETY LATCH FOR LIFTING HOOK

BACKGROUND OF THE INVENTION

The invention relates to a lifting hook comprising a hook body with a hook stem and a hook tip; a safety latch with a fastening end and a free latch end, the fastening end of the safety latch being pivotally fastened close to the hook stem so as to be moved between an open position and a closed position, the safety latch being in its open position substantially against the inside of the hook body in a position that leaves a hook jaw free while in the closed position of the safety latch the latch end extends across the hook jaw to the hook tip and against it, the latch end resting against the inside of the hook body and its jaw, closing the jaw; and means for actuating the safety latch, the means comprising a spring arranged between the safety latch and the hook body and forcing the latch end into the closed position, locking means for locking the safety latch into the open position, and release means for releasing the safety latch from the open position. The invention also separately relates to a safety latch to be attached to existing hooks, in which case the safety latch is of the above-described type.

The purpose of a safety latch for a lifting hook is to assist a user of the lifting hook of a crane to load and unload the hook safely and efficiently. The loading of the hook naturally refers to fastening a load to the hook and the unloading, correspondingly, to releasing the load from the hook. Safety and efficiency are considerably increased if the user is able to use both hands at the same time for releasing the load. Typically, the load is fastened to the hook by means of hoist belts, ropes, wire ropes or chains.

In known hooks, the safety latch is typically pressed open against a spring force pushing the safety latch close, and kept in the open position by one hand. This prevents the hand from being used for releasing the load as the hand must be used for keeping the safety latch open all the time when the load is being released. Moreover, opening the safety latch of large hooks and keeping it open requires a lot of force. Hence the load is very difficult to release and often another person is needed to keep the safety latch open. There is also a risk of hands or fingers getting caught between the safety latch and the hook body. All this may lead to a temptation to skip the use of the safety latch, for example by tying it permanently into the open position against the inside of the hook body by taping, for example.

However, methods have been developed to keep the safety latch open without the user having to use his/her hands for it. For example, the safety latch may be provided with a kind of an operating handle attached pivotally to the safety latch, at a distance from its fastening end, the handle extending around the hook body and being lockable behind the hook body into a position keeping the safety latch open. Such a safety latch is disclosed in U.S. Pat. No. 3,008,210. In such a solution, however, the operating handle has to be separately released after the load has been detached in order to tension the safety latch again into the closed position. This releasing action may require even quite a lot of strength, and if the safety latch has a powerful spring, the user may still hurt his/her hands if they for some reason get caught between the operating handle and the hook body or between the latch end of the safety latch and the hook body. If, again, the safety latch remains or is by accident left completely open after the load has been attached and for the duration of the next load lifting procedure, the lifting event may be dangerous since the hoist belts, ropes, wire ropes or chains may move upwards and come off the hook. Being stiff, wire ropes in particular may be susceptible to this.

SUMMARY OF THE INVENTION

An object of the invention is thus to improve the lifting hook and its safety latch so as to enable the aforementioned problems to be solved. This object is achieved by the lifting hook according to the invention, which is mainly characterized in that the locking means of the safety latch comprise a cam surface arrangement formed at the fastening end of the safety latch and a locking pawl structure arranged in the hook body, the safety latch, when turned into the open position, locking with the cam surface arrangement; and that the release means of the safety latch comprise a release latch arranged in front of the safety latch and having a length substantially corresponding to a distance extending across an opening of the jaw and being fastened to a fastening shaft of the safety latch and having at its fastening end a cam surface arrangement affecting the locking pawl structure in order to release the safety latch from the locking pawl structure at least by a downwards turning movement of the release latch, and whereby the release latch, in its waiting-for-release state, is in a position that extends substantially across the jaw. The safety latch according to the invention is characterized by what is disclosed in the characterizing part of claim 5. Preferred embodiments of the invention are disclosed in the dependent claims.

The invention is based on the locking pawl structure which, in the open position, keeps the safety latch against the spring force and which is releasable into the closed position by a separate release latch extending across the jaw.

An advantage of the lifting hook and the safety latch according to the invention is that the safety latch becomes reliable and convenient to operate. Consequently, the safety latch improves safety without invoking in the operating staff any desire to avoid using it or to remove it from the actual lifting apparatus.

The safety latch according to the invention is direction-activated, enabling it to be released from its state locked in the open position and facilitating load detachment in at least one turning direction, most preferably in both turning directions, of the release latch. The release latch is responsible for the safety latch returning to the locked position at least when the load is attached to the lifting hook. When operating in both directions, it is also responsible for the safety latch not remaining in the open position unnecessarily.

The structure according to the invention is well protected against external impacts since the safety latch itself protects parts relevant to its operation. It is compact and the mechanisms are very simple. Owing to the simple and well-protected construction, the solution is suitable for operation in a demanding environment in industrial use.

In some cases, it may be advantageous to have the safety latch fastened to the hook as a separate and detachable structure, in which case the hook or the hook stem does not have to be changed, the original strength of the hook thus remaining unchanged. In addition, this allows the original hook, which is usually made by forging and therefore a valuable manufactured piece, to be utilized.

LIST OF FIGURES

The invention is now described in closer detail by means of the preferred embodiments and with reference to the accompanying drawings, in which.

DETAILED DESCRIPTION OF THE INVENTION

Figure 1:
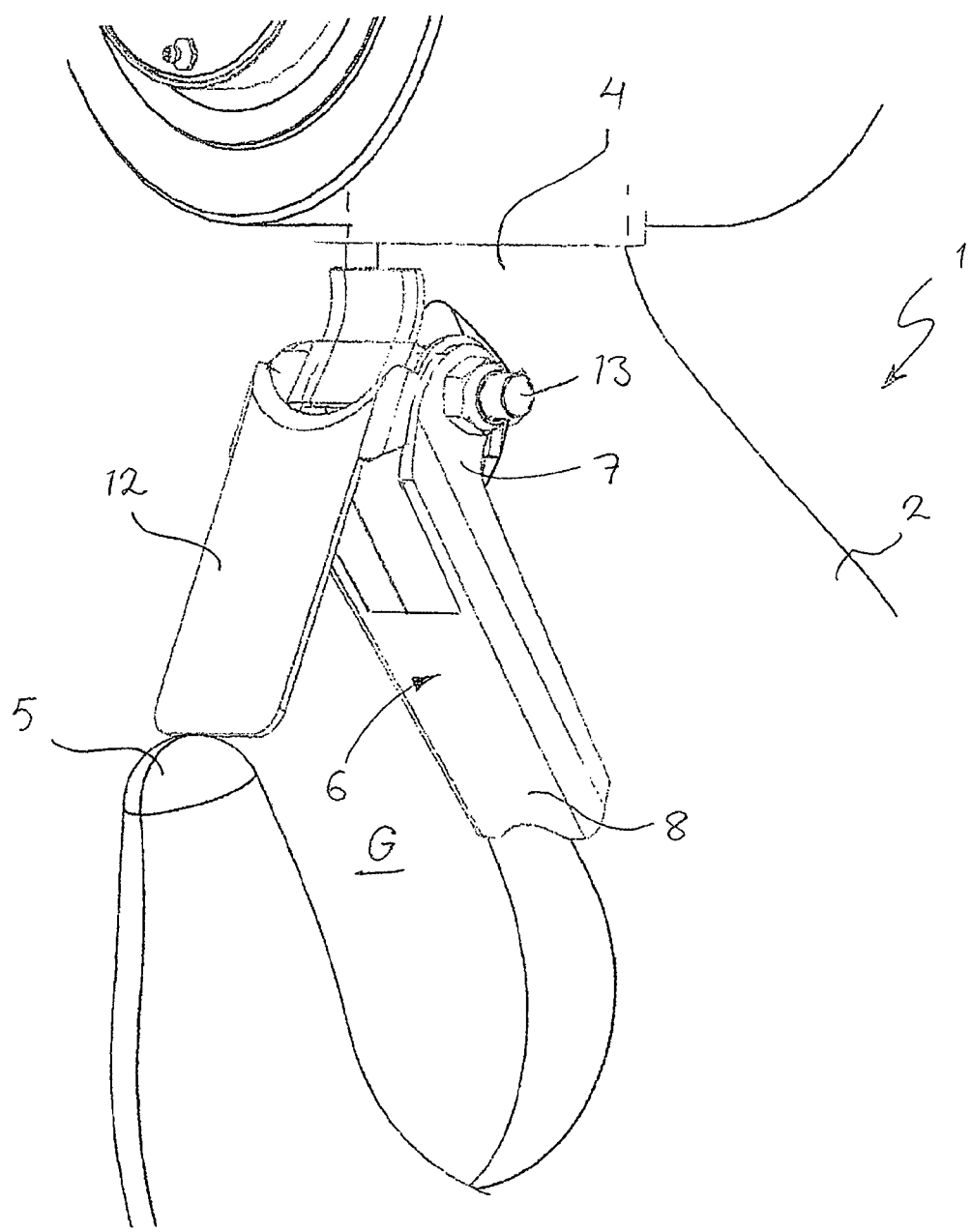
FIG. 1 is a perspective view of a preferred implementation of a lifting hook according to the invention, with its safety latch in an open position.
Figure 2:
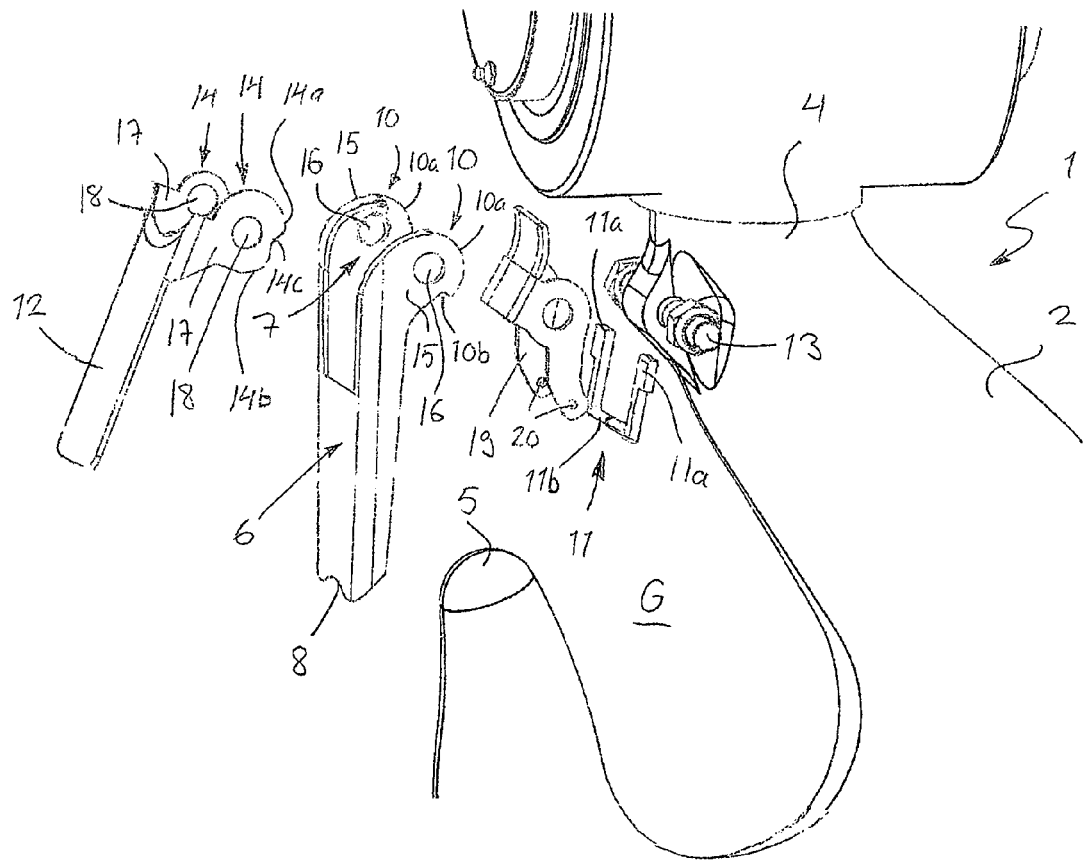
FIG. 2 is an exploded view of the lifting hook according to FIG. 1 and its safety latch.

Referring first mainly to FIGS. 1 and 2, a lifting hook 1 according to the invention comprises a hook body 2 provided with a hook stem 4 and a hook tip 5; a safety latch 6 with a fastening end 7 and a free latch end 8, the fastening end 7 thereof being pivotally fastened close to the hook stem 4 so as to be moved between an open position and a closed position, the safety latch 6 being in its open position substantially against the inside of the hook body 2 in a position that leaves a hook jaw G free, while in the closed position of the safety latch 6 the latch end 8 extends across the hook jaw G to the hook tip 5, resting against it on the inside of the hook body 2 and its jaw G and closing the jaw G; and actuating means of the safety latch which comprise a spring arranged between the safety latch 6 and the hook body 2 and forcing the latch end 8 into the closed position, locking means 10, 11 for locking the safety latch 6 into the open position, and release means 12 for releasing the safety latch 6 from the open position. For the sake of clarity of the figures, no such spring mentioned above is shown in the drawings, but it may be e.g. a spring comprising a loop to be arranged around a fastening shaft 13 of the safety latch, branches tensioned between the hook body 2 and the safety latch 6 protruding from the loop. This spring is also a structure known per se.

The locking means of the safety latch 6 comprise a cam surface arrangement 10 formed at the fastening end of the safety latch 6 and a locking pawl structure 11 arranged in the hook body 2, the safety latch 6, when turned into the open position, locking with the cam surface arrangement 10.

The release means of the safety latch 6 comprise a release latch 12 arranged in front of the safety latch 6 and having a length substantially corresponding to a distance extending across an opening of the jaw G and being fastened to the fastening shaft 13 of the safety latch 6 and having at its fastening end a cam surface arrangement 14 affecting the locking pawl structure 11 in order to release the safety latch 6 from the locking pawl structure 11 by both a downwards and upwards turning movement of the release latch 12, and whereby the release latch 12, in its waiting-for-release state, is in its position that extends substantially across the jaw G.

To be more precise, in the exemplary implementation according to the drawings, the safety latch 6 is provided with two spaced-apart fastening lugs 15 having fastening holes 16 for an inlet of the fastening shaft 13 as well as cam surfaces 10a of the cam surface arrangement 10 located on an outer circumference of the fastening lugs 15, the cam surfaces 10a being provided with a locking notch 10b for a locking pawl 11a of the locking pawl structure 11. The release latch 12 is arranged on top of the safety latch 6 and two spaced-apart fastening lugs 17 are provided therein which are located between the fastening lugs 15 of the safety latch 6, adjacent to them, and provided with holes 18 for the inlet of the fastening shaft 13 as well as cam surfaces 14a and 14b of a cam surface arrangement 14 which are located on the outer circumference of the fastening lugs 17 and between which a rest notch 14c is provided for the waiting-for-release position of the release latch 12. The locking pawl structure 11, which comprises two branches forming the locking pawls 11a and located at each cam surface arrangement 10, 14, is placed in a locking body 19 fastened between the fastening lugs 15 of the safety latch 6, on the same fastening shaft 13 as the safety latch 6 and the release latch 12. The locking pawl structure 11 is by means of a shaft 11b interconnecting the locking pawls 11a at their lower part fastened to holes 20 in the locking body 19, below the fastening shaft 13. The locking pawls 11a of the locking pawl structure 11 are by means of springs arranged between the locking body 19 and the locking pawls 11a tensioned to be pressed against the cam surface arrangements 10, 14 of the safety latch 12 and the release latch. For the sake of clarity of the figures, no such springs are shown, either, but they may be e.g. springs comprising loops to be arranged around the shaft 11b, branches tensioned between the locking pawls 11a and the locking body 19 protruding from the loops.

The operation of the safety latch 6 will be described in the following, referring to FIGS. 3 to 9.

Figure 3:
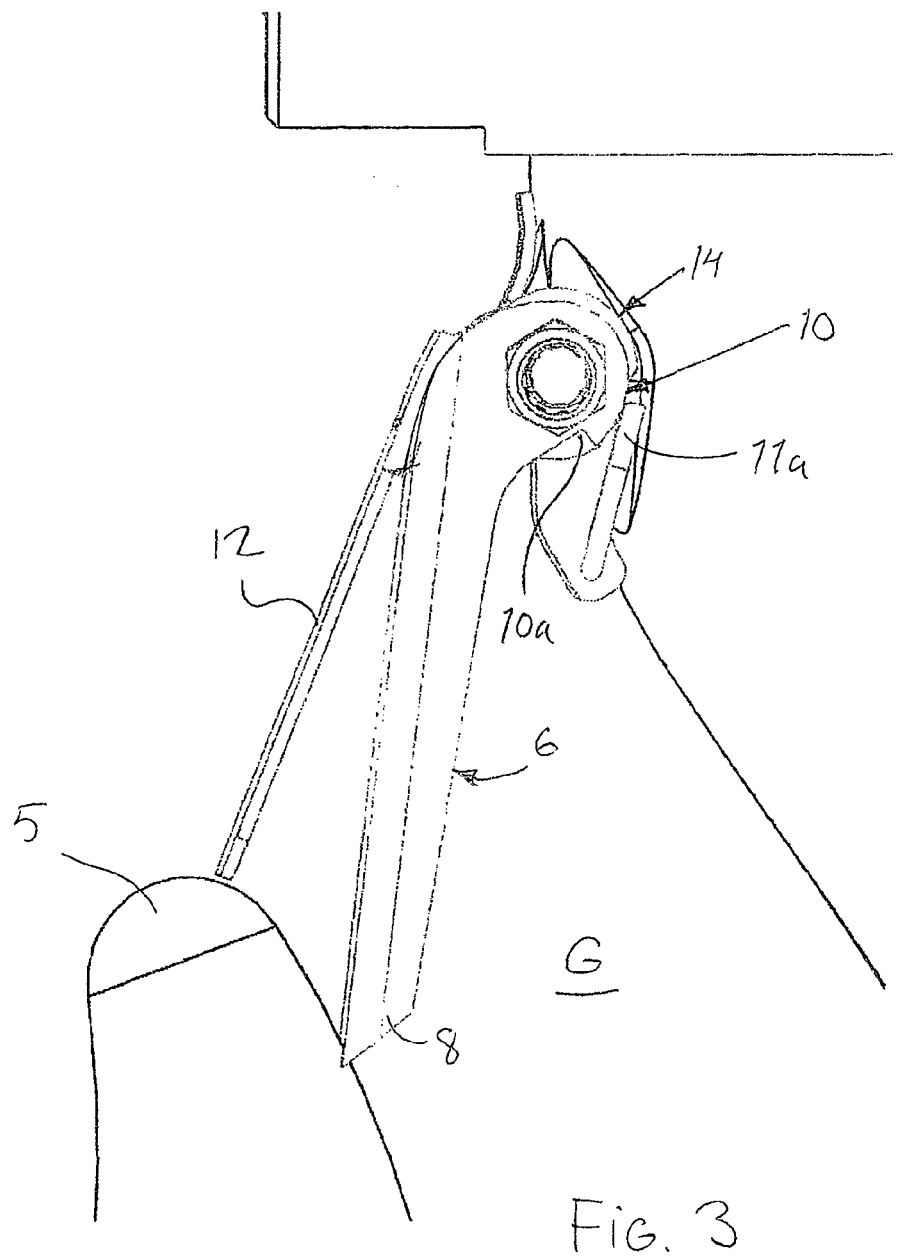
FIG. 3 shows the lifting hook according to FIGS. 1 and 2 and its safety latch in a normal closed state.

FIG. 3 shows a lifting hook 1 and its safety latch 6 in a normal closed position, in which case the latch end 8 of the safety latch 6 extends across the jaw G of the hook to the hook tip 5, resting against it on the inside of the hook body 2 and its jaw G and closing the jaw G.

Figure 4:
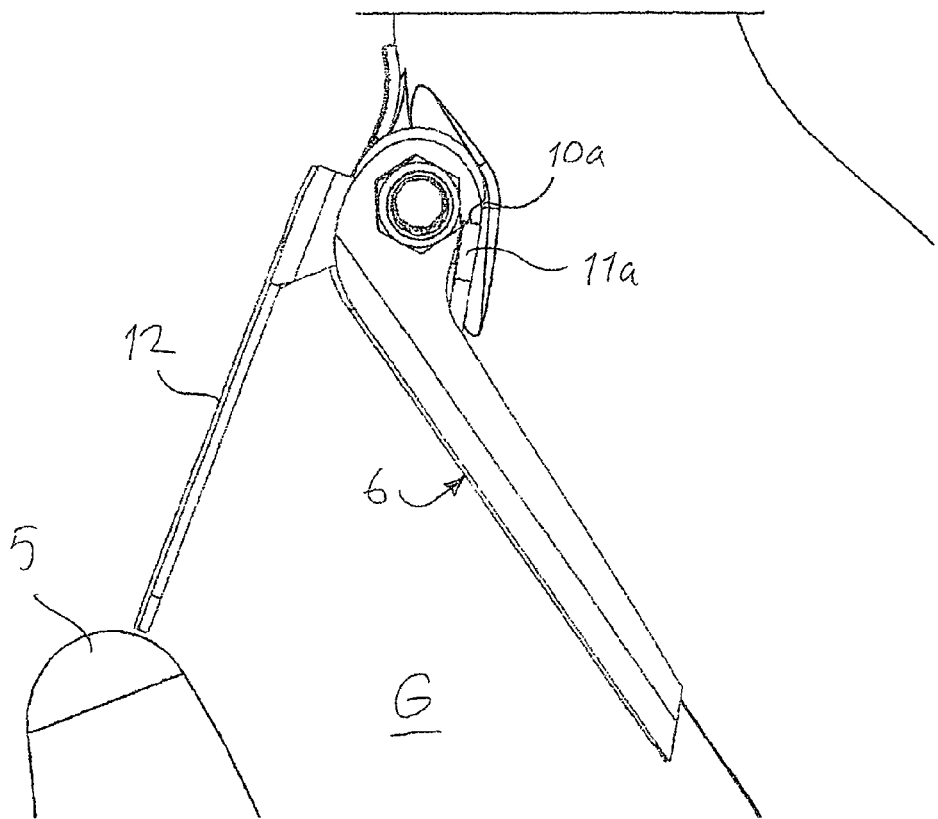
FIG. 4 shows the lifting hook according to FIGS. 1 and 2 and its safety latch in an open position for removing a load from the lifting hook.

In FIG. 4, the safety latch 6 has been manually turned to reside against the inside of the hook body 2, in which case the locking pawls 11a of the locking pawl structure 11 are locked in the locking notches 10b of the cam surfaces 10a of the safety latch 6. Similarly, in its normal position extending across the jaw G, the release latch 12 of the safety latch 6 is ready to release the safety latch 6 back into the closed position. In such a case, the locking pawls 11a of the locking pawl structure 11 are located in the rest notch 14c provided between the cam surfaces 14a and 14b of the release latch 12. Now, the load may be removed from the lifting hook 1 with no further need to touch the safety latch 6 by hand.

Figure 5:
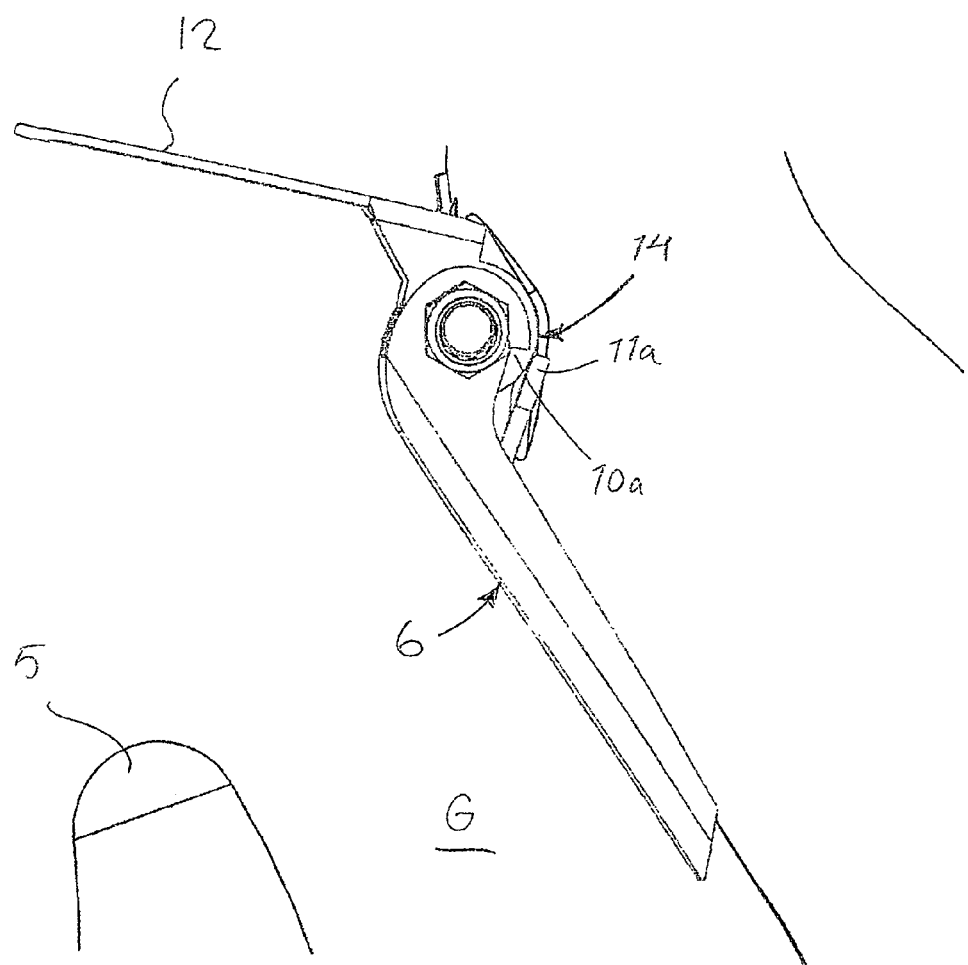
FIG. 5 shows the lifting hook according to FIGS. 1 and 2 and its safety latch when the load is being removed from the lifting hook.

In FIG. 5, the load is removed from the lifting hook 1, in which case the release latch 12 turns freely upwards and by means of its cam surfaces 14a releases the safety latch 6 from its above-described locking by pushing the locking pawls 11a off the locking notches 10b. Forced by a spring, the safety latch 6 returns to the position according to FIG. 3. The release latch 12 may be turned manually into the position according to FIG. 3.

Figure 6:
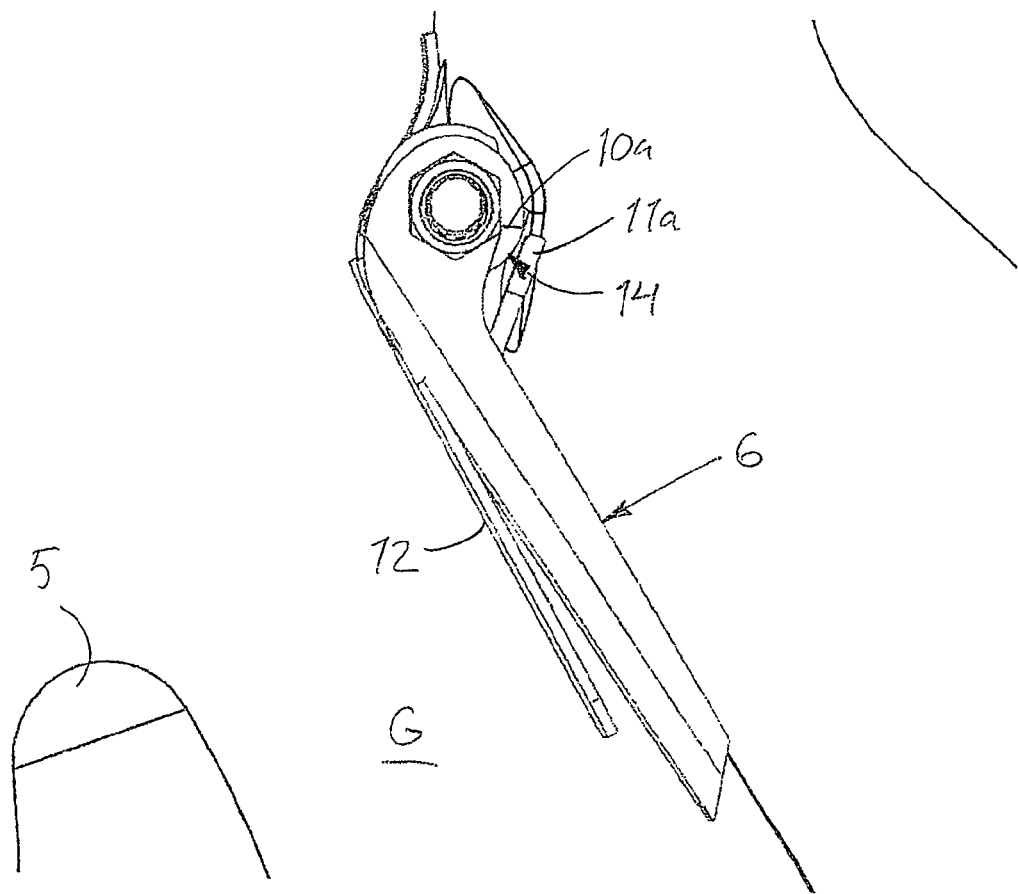
FIG. 6 shows the lifting hook according to FIGS. 1 and 2 and its safety latch when a load is being placed on the lifting hook.

In FIG. 6, a load is placed on the lifting hook 1 (when the initial position is as that shown in FIG. 3), in which case both the safety latch 6 and the release latch 12 are pressed downwards. In such a case, no locking of the safety latch 6 occurs but both the latches 6 and 12 return to the normal state according to FIG. 3. Here the release latch 12 returns to its place, lifted by the safety latch 6.

Figure 7:
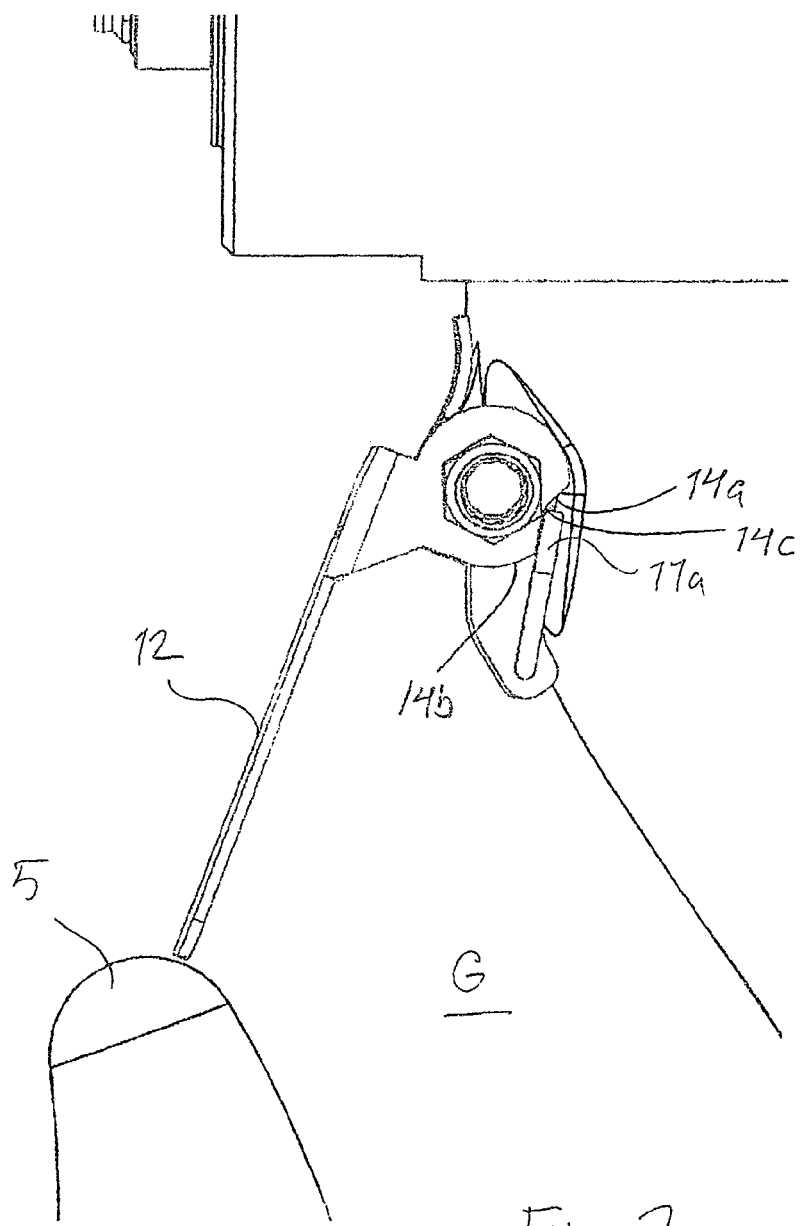
FIGS. 7 to 9 show positions of a release latch seen in FIGS. 3 to 4 with no safety latch.
Figure 8:
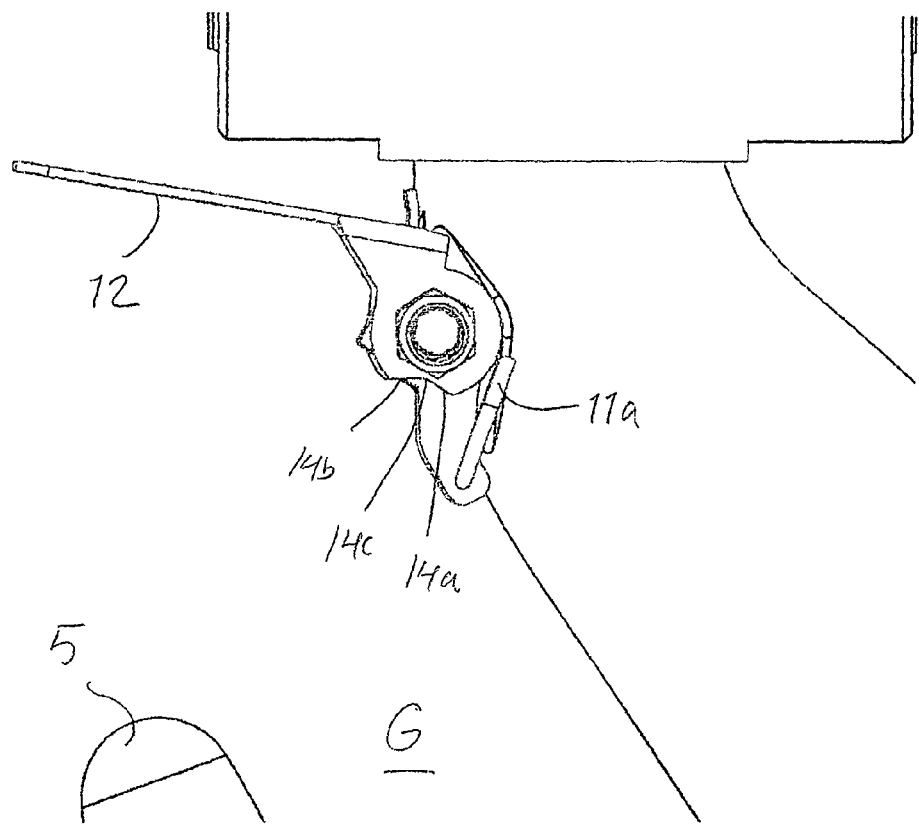
Figure 9:
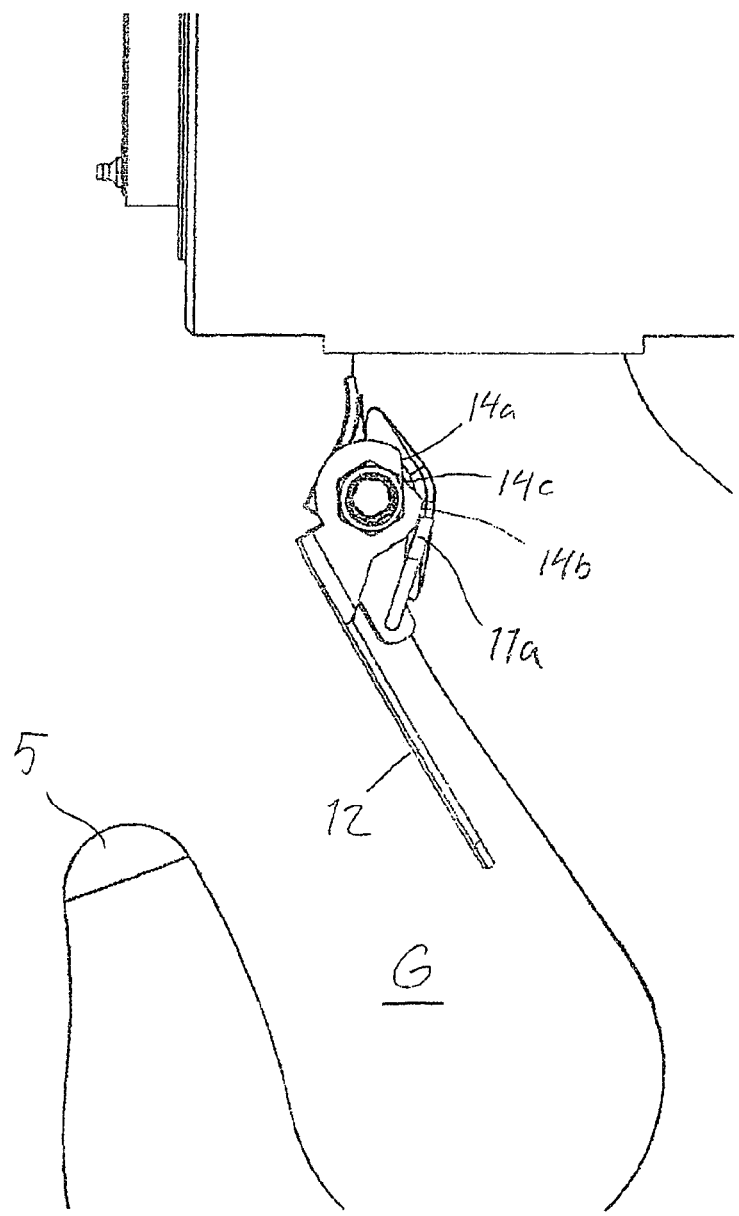

FIGS. 7 to 9 show the positions of the release latch 12 and its operation principle shown in FIGS. 3 to 4 more clearly without the safety latch 6.

Figure 10:
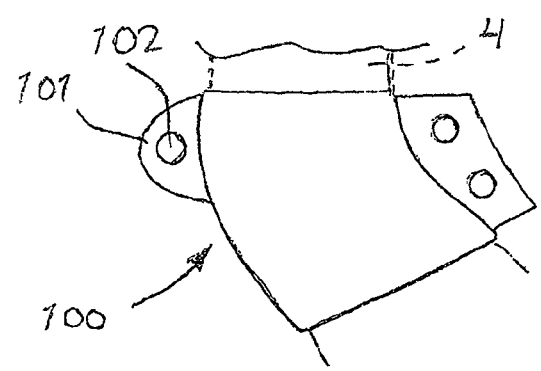
FIGS. 10 and 11 show a band structure enabling the safety latch according to the invention to be fastened to conventional lifting hooks having no safety latch.
Figure 11:
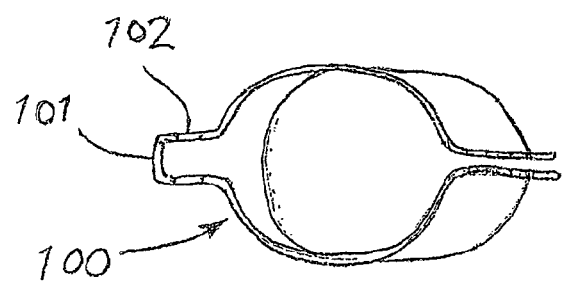

The safety latch structure described above, at least when suitably modified, may also be fastened to many existing lifting hooks that have no mounting hole on a front part of their stem for the fastening shaft 13 of the safety latch by using a mounting part 100 disclosed in FIGS. 10 and 11, for instance. This example of a mounting part is formed of a band 100 to be fastened around a top part of the hook stem 4 or the hook body 2 and having a hole 102 arranged in a bent front protrusion 101 thereof for the fastening shaft 13 of the safety latch. The disclosed mounting part 100 represents only one example, and the details of safety latches to be fastened by means of mounting parts may be suitably modified according to the mounting part and the lifting hook to be used. The mounting part or the band 100 may be shaped to comply with the shapes of the hook 1 such that it rests against the support surfaces so as to prevent sliding along the hook 1. Consequently, a slight loosening of the band 100 caused by a dent, for instance, does not result in a relative motion of the band 100 with respect to the hook 1, and the points of the shafts relevant to the operation of the mechanism remain substantially in the same places relative to one another.

The above description of the invention is only intended to illustrate the basic idea according to the invention. A person skilled in the art may thus vary its details within the scope of the accompanying claims.

The invention claimed is:

1. A lifting hook comprising:
a hook body with a hook stem and a hook tip;
a safety latch with a fastening end and a free latch end, the fastening end of the safety latch being pivotally fastened close to the hook stem so as to be moved between an open position and a closed position, the safety latch being in its open position substantially against an inside of the hook body in a position that leaves a hook jaw free, while in the closed position of the safety latch, the latch end extends across the hook jaw to the hook tip and against it, the latch end resting against the inside of the hook body and its jaw, closing the jaw; and
an actuator configured to actuate the safety latch, the actuator comprising a spring arranged between the safety latch and the hook body and forcing the latch end into the closed position, a lock configured to lock the safety latch into the open position, and a release configured to release the safety latch from the open position,
wherein the lock of the safety latch comprises a cam surface arrangement formed at the fastening end of the safety latch and a locking pawl structure arranged in the hook body, the safety latch, when turned into the open position, locking with the cam surface arrangement, and wherein the release of the safety latch a release latch arranged in front of the safety latch and having a length substantially corresponding to a distance extending across an opening of the jaw and being fastened to a fastening shaft of the safety latch and having at its fastening end a cam surface arrangement affecting the locking pawl structure in order to release the safety latch from the locking pawl structure at least by a downwards turning movement of the release latch, and whereby the release latch, in its waiting-for-release state, is in a position that extends substantially across the jaw.

2. The lifting hook as claimed in claim 1, wherein the cam surface arrangement of the release latch is arranged to release the safety latch from the locking pawl structure by both a downwards and upwards turning movement of the release latch.

3. The lifting hook as claimed in claim 2, wherein the safety latch is provided with two spaced-apart fastening lugs having fastening holes for an inlet of the fastening shaft as well as cam surfaces of the cam surface arrangement located on an outer circumference of the fastening lugs, the cam surfaces being provided with a locking notch for a locking pawl of the locking pawl structure, wherein the release latch is arranged on top of the safety latch and provided with two spaced-apart fastening lugs which are located adjacent to the fastening lugs of the safety latch and provided with holes for the inlet of the fastening shaft as well as cam surfaces of the cam surface arrangement which are located on the outer circumference of the fastening lugs, and wherein the locking pawl structure, which comprises two branches that form the locking pawls and are located at both cam surface arrangements, is placed in a locking body fastened between the fastening lugs of the safety latch, on the same fastening shaft as the safety latch and the release latch.

4. The lifting hook as claimed in claim 1, wherein the safety latch is provided with two spaced-apart fastening lugs having fastening holes for an inlet of the fastening shaft as well as cam surfaces of the cam surface arrangement located on an outer circumference of the fastening lugs, the cam surfaces being provided with a locking notch for a locking pawl of the locking pawl structure, wherein the release latch is arranged on top of the safety latch and provided with two spaced-apart fastening lugs which are located adjacent to the fastening lugs of the safety latch and provided with holes for an inlet of the fastening shaft as well as cam surfaces of the cam surface arrangement which are located on the outer circumference of the fastening lugs, and wherein the locking pawl structure, which comprises two branches that form the locking pawls and are located at both cam surface arrangements, is placed in a locking body fastened between the fastening lugs of the safety latch, on the same fastening shaft as the safety latch and the release latch.

5. The lifting hook as claimed in claim 4, wherein the locking pawls of the locking pawl structure are tensioned by means of a spring arrangement arranged between the locking body and the locking pawls to be pressed against the cam surface arrangements of the safety latch and the release latch.

6. A lifting hook comprising:
a hook body with a hook stem and a hook tip; tip, the safety latch being arrangeable in a mounting part arranged to be fastened close to the hook stem, and the safety latch having a fastening end and a free latch end, the fastening end of the safety latch being pivotally fastened to the mounting part so as to be moved between an open position and a closed position, the safety latch being in its open position substantially against the inside of the hook body in a position that leaves a hook jaw free, while in the closed position of the safety latch, the latch end extends across the hook jaw to the hook tip and against it, the latch end resting against the inside of the hook body and its jaw, closing the jaw; and
an actuator configured to actuate the safety latch, the actuator comprising a spring arranged between the safety latch and the mounting part and forcing the latch end into the closed position, a lock configured to lock the safety latch into the open position, and a release configured to release the safety latch from the open position,
wherein the lock of the safety latch comprises a cam surface arrangement formed at the fastening end of the safety latch and a locking pawl structure arranged in the mounting part, the safety latch, when turned into the open position, locking with the cam surface arrangement, wherein the release means of the safety latch comprises a release latch arranged in front of the safety latch and having a length substantially corresponding to a distance extending across an opening of the jaw and being fastened to a fastening shaft of the safety latch and having at its fastening end a cam surface arrangement affecting the locking pawl structure in order to release the safety latch from the locking pawl structure at least by a downwards turning movement of the release latch, and whereby the release latch, in its waiting-for-release state, is in a position that extends substantially across the jaw.

7. The lifting hook as claimed in claim 6, wherein the cam surface arrangement of the release latch is arranged to release the safety latch from the locking pawl structure by both a downwards and upwards turning movement of the release latch.

8. The lifting hook as claimed in claim 7, wherein the mounting part comprises a band to be fastened around a top part of the hook stem or the hook body and having a hole arranged in a bent protrusion thereof for the fastening shaft of the safety latch.

9. The lifting hook as claimed in claim 6, wherein the mounting part comprises a band to be fastened around a top part of the hook stem or the hook body and having a hole arranged in a bent protrusion thereof for the fastening shaft of the safety latch.

\* \* \* \* \*